UNITED STATES PATENT OFFICE.

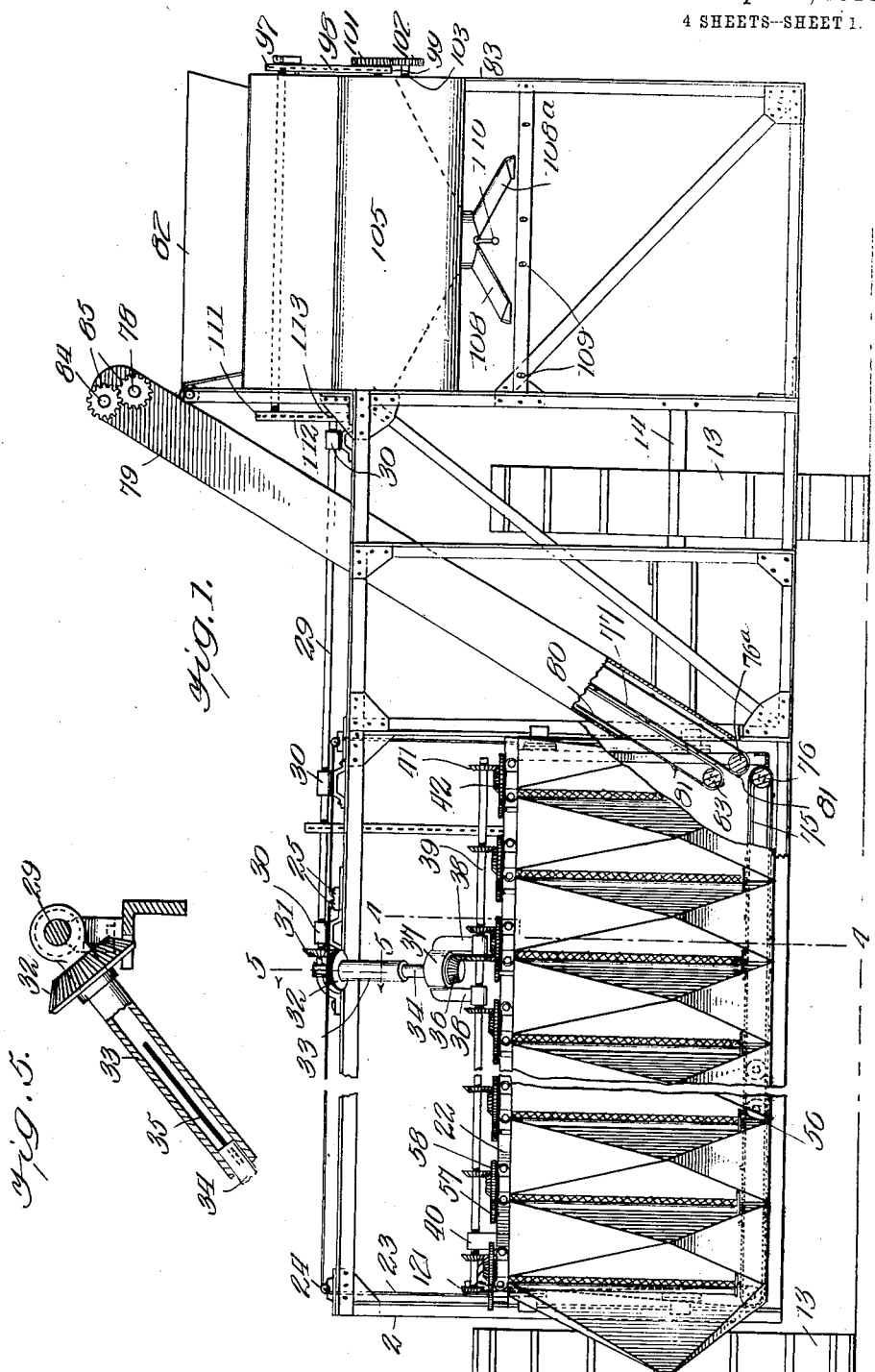

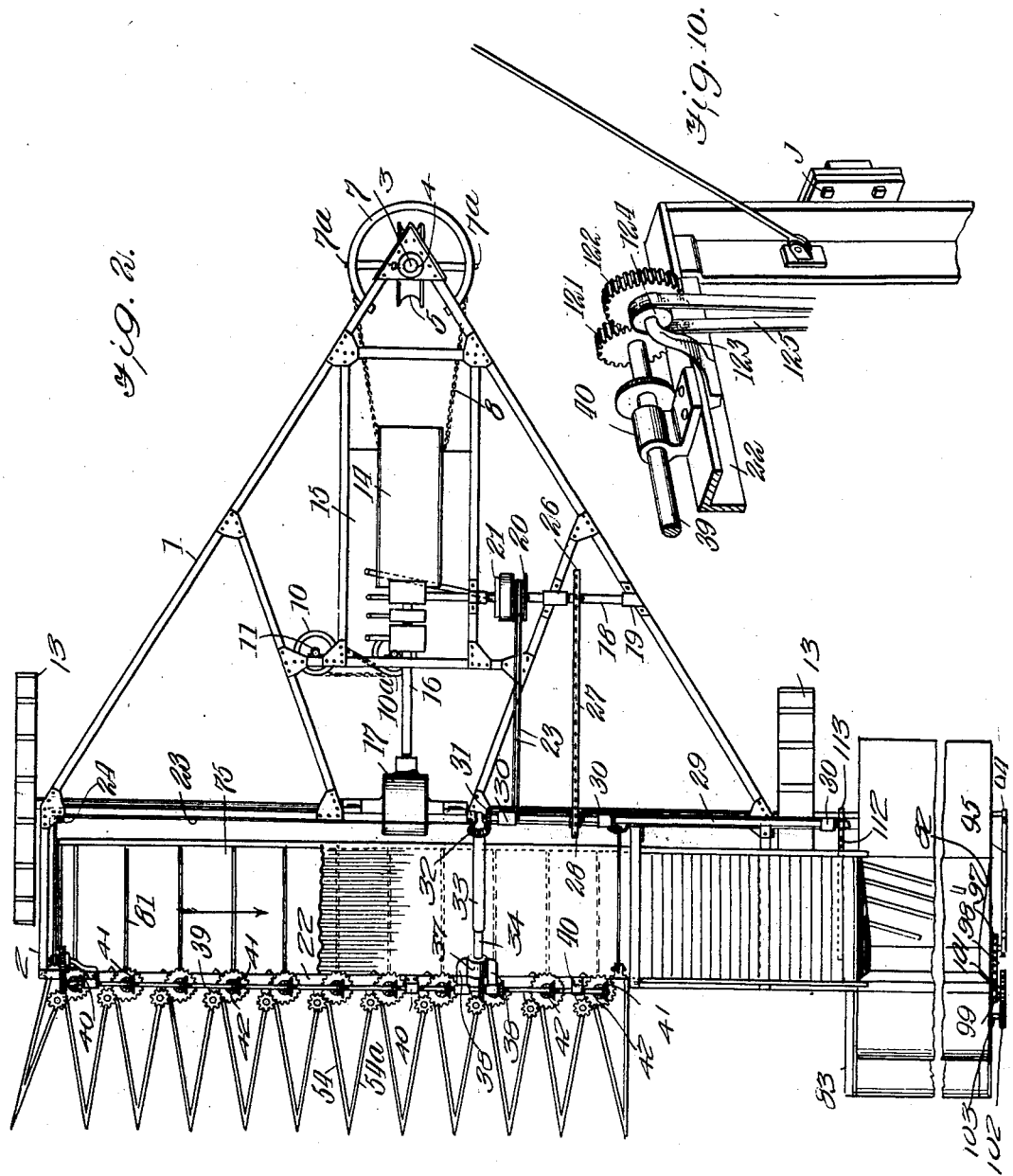

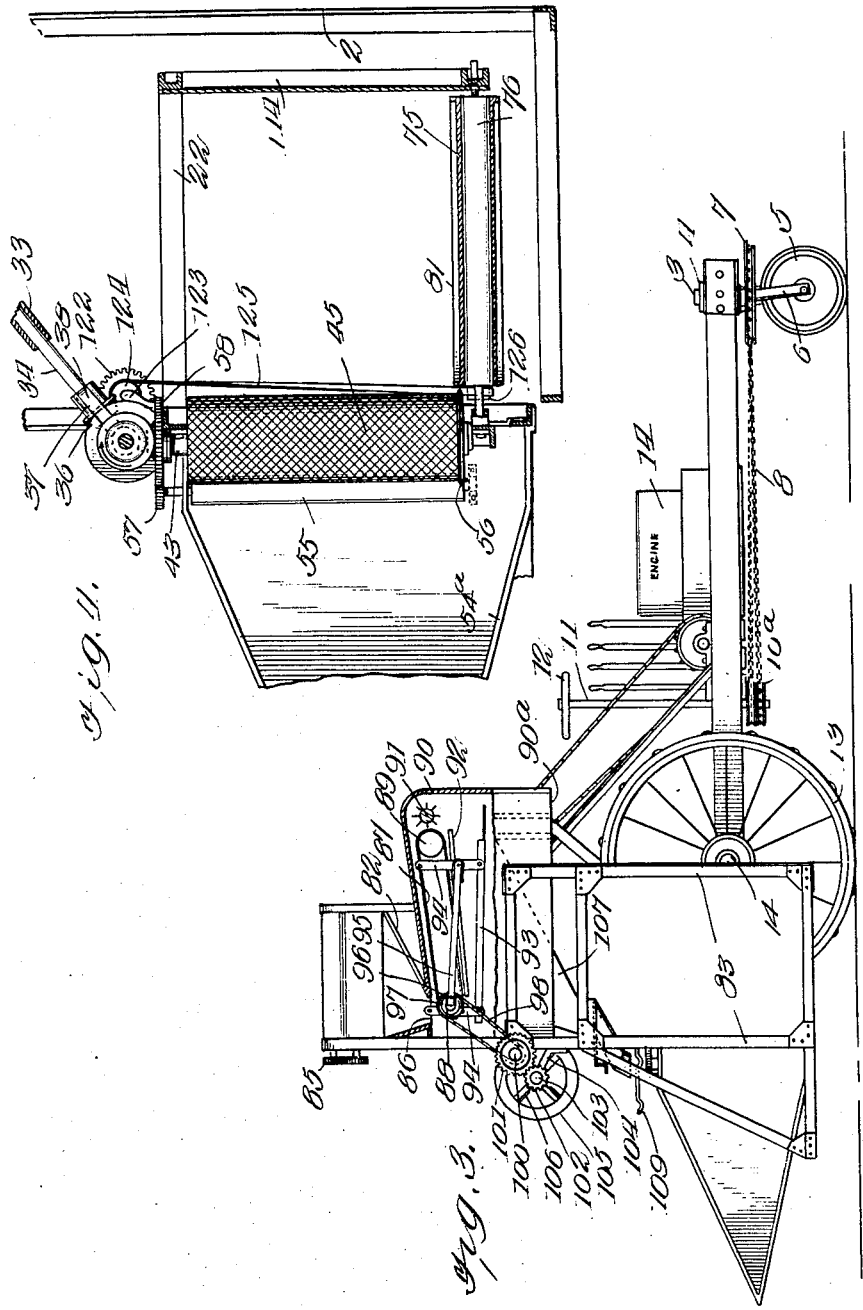

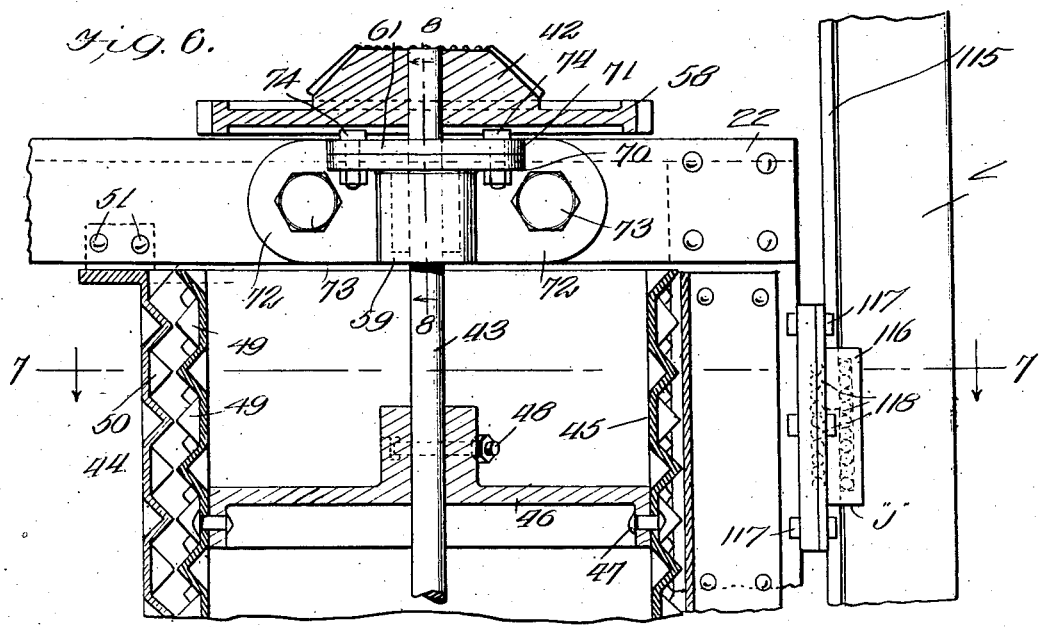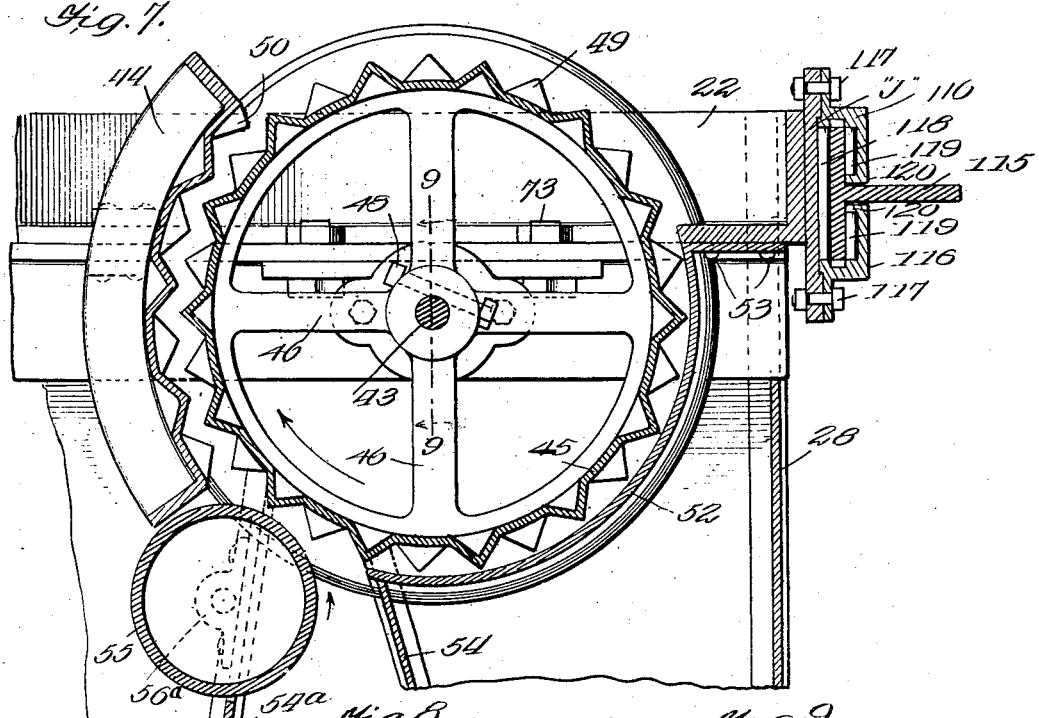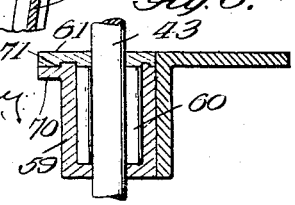

ANDREW M. ANDERSON, OF MOSCOW, IDAHO.

THRESHING-MACHINE.

1,111,554. Specification of Letters Patent. Patented Sept. 22, 1914.

Application filed November 16, 1912. Serial No. 731,690.

*To all whom it may concern:*

Be it known that I, ANDREW M. ANDERSON, a citizen of the United States, and a resident of Moscow, in the county of Latah and State of Idaho, have invented a new and useful Improvement in Threshing-Machines, of which the following is a specification.

My invention is an improvement in threshing machines, and has for its object the provision of a machine of the character specified, wherein means is provided for removing the heads from the stalk and for husking the grain immediately after the heads are separated.

A further object is to provide other mechanism for separating the grain from the chaff, and for delivering the grain and the chaff separately from the machine.

In the drawings:—Figure 1 is a front view of the improved machine, Fig. 2 is a top plan view, with parts omitted for the sake of clearness. Fig. 3 is a side view with parts in section, Figs. 4 and 5 are sections on the lines 4—4 and 5—5 respectively of Fig. 1, Fig. 6 is a partial vertical section of one of the cylinders, Figs. 7 and 8 are sections on the lines 7—7 and 8—8 respectively of Fig. 6, Fig. 9 is a section on the line 9—9 of Fig. 7, Fig. 10 is a perspective view of the connection between the cylinder operating shaft and the draper operating mechanism.

The present embodiment of the invention comprises a substantially triangular frame 1, having at its apex a steering device to be described, and having at the front a substantially rectangular extension 2, in which the harvesting and threshing mechanism is mounted for vertical movement. The body 3 of a yoke is journaled at the apex of the frame 1 in a bearing 4 and a wheel 5 is journaled between the arms 6 of the yoke. A peripherally grooved segment 7 is secured to the yoke above the wheel, and the ends of a chain 8 are secured to the opposite sides of the segment as shown at 7ª and the body extends forwardly and is engaged with a pulley 10 secured to the lower end of a shaft 11, journaled in the frame and having at its upper end a hand wheel 12 for convenience in turning the same. The chains adjacent to the pulley 10 pass over a double pulley 10ª journaled on the frame. By means of the hand wheel the plane of the wheel 5 may be changed to guide the frame through the field. The front or base of the frame is supported by wheels 13, which are secured to the ends of an axle 14, journaled in the extension 2. A motor 14 of suitable construction as for instance, an explosion engine, is supported on a platform 15 at approximately the center of the frame 1, and the shaft 16 of the engine extends forwardly into a housing 17. The shaft or axle 14 is divided, the inner ends thereof extending into the housing 17 where any suitable connecting mechanism is arranged for connecting the said inner ends with the forward end of the shaft 16. A shaft 18 is journaled in bearings 19 on the frame 1, and a drum 20 is journaled loosely on the shaft. A clutch 21 is provided for connecting the drum with the shaft, and the shaft is driven from the engine 14 in any suitable manner.

An auxiliary frame 22 is mounted for vertical sliding movement in the extension 2 and cords or cables 23 are connected with the auxiliary frame, the said cords passing upwardly over the rollers or pulleys 24 at the corners of the extension, and hence inwardly and downwardly over pulleys or rollers 25, and hence rearwardly over other pulleys to wind upon the drum. When the drum is clutched to the shaft, the drum will be rotated to raise the auxiliary frame in the extension. A sprocket wheel 26 is secured to the shaft 18, and a chain 27 connects the said wheel with a wheel 28 on a shaft 29 journaled in bearings 30 on the extension.

A bevel gear 31 is secured to the inner end of the shaft 29 and the said gear meshes with a bevel gear 32 on the outer section 33 of a telescoping shaft, whose inner section 34 is slidable in the outer section and is splined thereto as shown at 35 in Fig. 5, and the said inner section is provided at its lower end with a bevel gear 36.

The lower end of the inner section 34 is journaled in a bearing 37 having arms 38 provided with bearings, which engage a shaft 39 journaled in bearings 40 on the upper end of the auxiliary frame. The shaft 39 is provided at regular intervals with bevel pinions 41, each of which meshes with a bevel gear 42 on the shaft 43 of a cylinder to be described.

The telescoping shaft 33—34 insures a driving connection between the shafts 29 and 39, regardless of their relative position with regard to each other. When the auxiliary frame is lifted, the inner section 34 of the shaft slides inwardly in the outer section 33.

As many cylinders may be provided as may be desired, and each cylinder coöperates with the concave 44. Each cylinder (Figs. 6 and 7) consists of a drum 45, connected to the shaft 43 by means of castings 46, each of which is connected to the drum by means of bolts or rivets 47, and to the shaft by means of bolts and nuts 48. The outer face of each drum is provided with a plurality of peripheral projections 49, the drum being pressed to form the said projections, and the said projections are arranged with their bases in contact. Each of the concaves 44 consists of a plate arched transversely, and shaped so that the concave surface is provided with peripheral projections 50, corresponding to the projections 49.

The concave is shaped on an arc whose center is the shaft 43 and is arranged with respect to the cylinder, so that the projections 49 just miss the projections 50. The upper end of the concave is bolted to the auxiliary frame 22 as shown at 51, and an arc shaped shield or hood 52 is arranged on the opposite side of the cylinder from the concave, the adjacent edges of the concave and the shield being spaced apart as shown in Fig. 7 to permit the entrance of the grain.

The shield or hood is bolted to the auxiliary frame 22 as shown at 53, and at the front edge of the shield dividing fingers are provided, each of the said fingers consisting of two planes 54 and 54ª, connected at their outer edges and diverging at their inner edges, one of the said planes 54 having its inner edge connected with the front edge of the shield 52.

A feed roller in the shape of a drum 55 is journaled at the forward end of each concave in bearings 56ª on the auxiliary frame, and the inner edge of each plane 54ª is arranged adjacent to the periphery of the said roller. The planes 54 and 54ª are triangular in form as shown more particularly in Figs. 3 and 4, and the apices of the planes are arranged forwardly. The said fingers separate the grain into lots or bundles of a size such that one cylinder can take care of the said lots. The said walls of the adjacent fingers that is, the planes 54 and 54ª converge toward their inner ends and condense the grain as it passes rearwardly, and the roller 55 and the cylinder engage the grain and pass it between the cylinder and the concave, breaking the heads and separating the grain from the husks.

A cutting blade or disk 56 is arranged at the lower end of each cylinder 45 for severing the heads from the stalks and each of the rollers 55 is rotated by means of a pinion 57 secured to the upper end of the shaft of the roller and meshing with a gear wheel 58 on the shaft 43. Each of the shafts 43 is journaled at its ends as shown in Figs. 8 and 9, the upper end of the said shaft being journaled in a cup-shaped housing 59 having an opening in its lower end for receiving the shaft, and a roller bearing 60 is arranged between the shaft and the side wall of the housing.

A cover 61 is provided for the upper end of the bearing, the said cover also having an opening for receiving the shaft. The lower end of the shaft 43 is also received in a cup-shaped bearing 62, and a roller bearing 63 is arranged between the shaft and the side wall of the bearing. The lower end of the shaft 43 is recessed as is also the inner face of the lower end of the bearing 62, and a ball 64 is arranged in the registering recesses. The upper end of the bearing 62 is flanged laterally as shown at 65 and a cover 66 having a centrally perforated boss 67 fits within the upper end of the bearing, covering the said bearing, the shaft passing through the boss.

The lower end of the bearing is provided with a central enlargement 68 which fits within a similarly shaped recess 69 in the frame. The upper end of the bearing 59 is flanged laterally as shown at 70, and the said flange is secured by bolts 74 to a flange 71 on the cover 61, and the bearing 59 is provided with lateral flanges 72, which are secured to the auxiliary frame 22 by bolts 73.

The ball 64 receives the downward thrust of the shaft 43 and the roller bearings 60 and 63 receive the lateral thrust. It will be understood that all of the cylinders are similarly mounted.

The grain passes from between the cylinders and the concaves to a draper or endless belt 75, supported by rollers 76 journaled in the auxiliary frame, with its upper run immediately below the blades or disks 56. The grain falls on the upper run of the draper and passes to the right of Fig. 1, and is delivered to the upper run of a second draper 77 supported by one of the rollers 76 and a roller 78, the latter roller being journaled at the upper end of an elevator box or casing 79. The lower run of a second draper or endless belt 80 coöperates with the upper run of the belt or draper 77 to lift the grain, and each of the three drapers 75, 77 and 80 is provided with transverse slats 81 for assisting in moving the grain. The upper end of the elevator formed by the drapers 77 and 80 delivers to a hopper 82, arranged on an extension 83 of the extension frame 2. The draper 80 is supported by lower and upper rollers 83 and 84 respectively, and the rollers 78 and 84 are provided with intermeshing pinions 85 outside the box or case 79.

From the hopper 82 the grain passes through an opening 86 in the bottom thereof, on to the conveyer 87 supported on rollers 88 and 89 respectively which are journaled in a casing or housing 90. A picker roller 91 is journaled in the housing adjacent to the roller 89 and parallel therewith, and the upper run of the conveyer 87 moves toward the picker roller. The chaff is carried rearwardly by the conveyer and is passed downwardly by the said conveyer and the picker roller through an opening 90ª in the bottom of the casing 90 and at the rear thereof.

A grain board 92 is arranged below the lower run of the conveyer, and the shoe 93 is arranged below the grain board. The shoe is supported by levers 94, each of which is pivoted at its upper end to the casing or housing 90 and at its lower end to the shoe. The shoe is vibrated or shaken by means of a pitman 95 pivoted at one end to one of the levers 94 and at the other to a pin 96 on a sprocket wheel 97 on the outer end of the roller 88. The sprocket wheel 97 is connected by means of a sprocket chain 98 to a sprocket wheel 99 on a stub shaft 100 journaled on the extension frame 83.

A gear wheel 101 on the stub shaft meshes with a gear wheel 102 on a shaft 103 journaled in bearing brackets 104 on the said extension frame and in a fan casing 105. The fan 106 delivers a blast rearwardly and upwardly through the shoe and through the grain as it falls from the grain board on to the shoe, thus blowing out all of the chaff and broken stalks, husks and the like which fall through the opening 90ª while the grain passes downwardly through a chute 107, and is delivered by spouts 108, 108ª to sacks which may be suspended from supports 109, below the spouts. A valve not shown, is arranged at the junction of the spouts 108, 108ª and by means of the handle 110 on the valve, the grain may be diverted into either spout.

The inner end of the roller 88 is provided with a sprocket wheel 111, connected by a sprocket chain 112, with a sprocket wheel 113 on the shaft 29 before mentioned. The roller 88 is thus driven and in turn drives the roller 89, the shaft 100 and the fan 106.

The draper 75 forms the bottom of a receptacle having a rear wall 114, the front wall being formed by the cylinders and concaves.

The auxiliary frame 22 may be raised or lowered in accordance with the height of the grain to be cut. It will be understood that but little more than the head of the grain is removed. The auxiliary frame is raised or lowered by means of the drum 20 and the height at which the frame stands is under the control of the operator at the engine 14. The operator also guides the frame by means of the wheel 5, and as the machine moves through the field, the stalks are separated by the fingers and each row or division between adjacent fingers is condensed and fed by the roller 55 to the adjacent cylinder and concave.

The auxiliary frame engages the extension frame 2 at the front of the said frame as shown more particularly in Figs. 6 and 7. Each of the front members of the extension frame is T-shaped in cross-section as shown at 115 in Fig. 7, and the auxiliary frame is provided with guideways for receiving the cross member of the T. The guideways are formed by approximately Z-shaped plates 116, secured to the auxiliary frame by bolts 117. A series of rollers 118 is arranged between the inner face of the cross member of the T and the auxiliary frame, and other series 119 of rollers are arranged between the outer face of the said cross member and the adjacent plate 116. The series 119 are held in place by inwardly extending flanges 120 on the Z-shaped plates. With this construction, the auxiliary frame may move freely vertically on the extension frame in accordance with the height of the grain to be cut.

The outer end of the shaft 39 is provided with a pinion 121 (Fig. 10) which meshes with a pinion 122 on the stub shaft 123, secured to the auxiliary frame 22. A pulley 124 rigid with the pinion 122 is also journaled on the shaft and a belt 125 connects the said pulley with a pulley 126 on the adjacent lower roller 76 of the draper. The draper is thus operated from the shaft 39.

In operation, the machine is moved through the field as before mentioned and the grain cut by the knives or disks 56 is fed by the rollers 55 to the cylinders. The cylinders and concaves husk the grain, which is delivered on to the upper run of the draper 75. The draper 75 passes the grain to the elevator consisting of the aprons or belts 77—80 and the elevator delivers the grain and chaff to the hopper 82 which delivers the grain and chaff to the conveyer 87. The separating mechanism in the casing or housing 90 delivers the chaff and straw through the opening 90ª while the grain passes through the chutes 108, 108ª to the bags supported by the supports 109.

I claim:—

1. In a threshing machine, a wheel supported main frame, a motor supported on the frame, vertical guides at the front of the frame, an auxiliary frame movable vertically in the guides, means for raising and lowering the said auxiliary frame, a plurality of cylinders and concaves supported by the auxiliary frame, said cylinders being journaled on vertical axes in spaced relation and a concave being arranged adjacent to each cylinder, a driving connection between each cylinder and the motor, dividing fingers extending forwardly from the auxiliary frame between adjacent cylinders for guiding the standing grain between the cylinders and the concaves, a feed roller coöperating with each cylinder and driven thereby, for feeding the grain between the cylinder and the adjacent concave, a cutting disk at the lower end of each feed roller, and means in rear of the cylinders for receiving and removing the grain.

2. A threshing machine comprising a wheel supported main frame, a motor supported on the frame, vertical guides at the front of the frame, an auxiliary frame movable vertically in the guides, means operated by the motor for raising and lowering the said auxiliary frame, a plurality of cylinders and concaves supported by the auxiliary frame, said cylinders being journaled on vertical axes in spaced relation and a concave being arranged adjacent to each cylinder, a driving connection between each cylinder and the motor, dividing fingers extending forwardly from the auxiliary frame between adjacent cylinders for guiding the standing grain between the cylinders and the concaves, a feed roller coöperating with each cylinder and driven thereby for feeding the grain between the cylinder and the adjacent concave, means between the guiding fingers and the cylinders and concaves for cutting the grain as it enters between the cylinder and the concave, and means in rear of the cylinders for receiving and removing the grain.

3. A threshing machine comprising a wheel supported main frame, a motor supported on the frame, vertical guides at the front of the frame, an auxiliary frame movable vertically in the guides, means operated by the motor for raising and lowering the said auxiliary frame, a plurality of cylinders and concaves supported by the auxiliary frame, said cylinders being journaled on vertical axes in spaced relation and a concave being arranged adjacent to each cylinder, a driving connection between each cylinder and the motor, means for feeding grain between the cylinders and the concaves, means at each cylinder and extending across the space between the cylinder and the adjacent feed roller for cutting the grain as it is fed between the cylinder and the concave, and means in rear of the cylinders for receiving and removing the grain.

4. A threshing machine comprising a main wheel supported frame, means for guiding the frame, a motor on the frame, said main frame having vertical guides at its front end, an auxiliary frame supported in the guides, means operated by the motor for raising or lowering the auxiliary frame, a plurality of cylinders and concaves supported by the auxiliary frame, said cylinders being journaled on vertical axes in spaced relation and a concave being arranged adjacent to each cylinder, a common driving mechanism for the cylinders and connected to the motor, means for feeding the grain between the cylinders and concaves, cutting mechanism at the lower ends of the cylinders for cutting the grain and means for receiving the grain from the cylinders and concaves.

5. A threshing machine comprising a main wheel supported frame, means for guiding the frame, an auxiliary frame movable vertically on the main frame at the front thereof, means for raising and lowering the auxiliary frame, said auxiliary frame having a series of forwardly extending dividing fingers, each of the said fingers consisting of two planes diverging from their front ends toward the auxiliary frame, a cylinder and a concave supported behind and between each adjacent pair of dividing fingers, each cylinder being journaled for rotation and a concave being arranged adjacent thereto, a feed roller adjacent to each cylinder and coöperating therewith to feed the grain between the cylinder and the concave, means for rotating the cylinders and the feed rollers, and means for receiving the grain from the cylinders.

6. A threshing machine comprising a main frame, an auxiliary frame mounted for vertical movement on the main frame, a series of cylinders and concaves supported by the auxiliary frame, each cylinder coöperating with a concave for threshing the grain, said cylinders being mounted to rotate on vertical axes, means for rotating the cylinders, means for feeding the grain between the cylinders and the concaves, said feeding means comprising dividing fingers arranged to separate the standing grain and to guide it into the spaces between the several concaves and cylinders, and means at the lower ends of the cylinders for cutting the grain.

7. A threshing machine comprising a main frame, an auxiliary frame mounted for vertical movement on the main frame, a series of cylinders and concaves supported by the auxiliary frame, each cylinder coöperating with a concave for threshing the grain, said cylinders being mounted to rotate on vertical axes, means for rotating the cylinders, means for feeding the grain between the cylinders and the concaves, and means at the lower end of each cylinder for cutting the grain.

8. A threshing machine comprising a supporting frame, a series of cylinders journaled on vertical axes at the front of the supporting frame, said cylinders being spaced apart from each other, a concave co-operating with each cylinder, dividing fingers extending forwardly from the frame between the adjacent cylinders for dividing the standing grain and guiding the said grain to the several cylinders and between each cylinder and the adjacent concave, and means at the lower end of each cylinder for cutting the grain, each of the said means extending across the space between the cylinder and the concave for cutting the grain as it enters between the cylinder and the concave.

ANDREW M. ANDERSON.

Witnesses:
S. B. H. McGowan,
Emma Junge.